United States Patent [19]
Morita et al.

[11] Patent Number: 5,627,811
[45] Date of Patent: May 6, 1997

[54] CONSTANT LINEAR VELOCITY OPTICAL DISK APPARATUS HAVING IMPROVED CIRCUITRY FOR SPEED DATA ACCESS

[75] Inventors: Tsutomu Morita, Mitaka; Hiroyuki Onda, Higashikurume; Masasi Tanaka, Higashimurayama; Katsumi Aoyama, Higashikurume, all of Japan

[73] Assignee: TEAC Corporation, Japan

[21] Appl. No.: 488,658

[22] Filed: Jun. 8, 1995

[30] Foreign Application Priority Data

Jun. 14, 1994 [JP] Japan ..................................... 6-132172

[51] Int. Cl.$^6$ ...................................................... G11B 7/00
[52] U.S. Cl. ................................................. 369/50; 369/47
[58] Field of Search .............................. 369/44.28, 44.26, 369/47, 50, 58, 44.29, 48, 32; 360/73.03

[56] References Cited

U.S. PATENT DOCUMENTS

| | | | |
|---|---|---|---|
| 4,783,774 | 11/1988 | Enomoto | 369/50 |
| 5,010,540 | 4/1991 | Fuji et al. | 369/50 |
| 5,093,820 | 3/1992 | Maeda et al. | 369/50 |

FOREIGN PATENT DOCUMENTS

| | | |
|---|---|---|
| 60-128878 | 7/1985 | Japan . |
| 63-255870 | 10/1988 | Japan . |
| 1-109573 | 4/1989 | Japan . |

OTHER PUBLICATIONS

Shortley and Williams, "Elements of Physics" 1953, pp. 156–157.

*Primary Examiner*—W. R. Young
*Assistant Examiner*—Thang V. Tran
*Attorney, Agent, or Firm*—Andrus, Sceales, Starke & Sawall

[57] ABSTRACT

An optical disk apparatus includes a disk servo unit which generates a servo signal based on a data signal read from an optical disk. The servo signal is supplied to a disk motor to control a rotation of the motor so that a linear velocity of the disk is kept constant when data is read from or written onto the disk. The disk servo unit is connected to the motor when the data is read from or written onto the disk, so that the servo signal is supplied to the motor, and the disk servo unit is disconnected from the motor when a pickup jumps from a present track of the disk to a destination track thereof so that the supply of the servo signal to the motor is inhibited. A velocity change signal which enables the motor to increase or decrease a rotating speed of the motor is generated depending on which one of two directions of the track jump is specified by a direction signal. A time signal which defines an estimated time of the track jump required to change an angular velocity at the present track to an angular velocity at the destination track is generated. The optical disk apparatus supplies the velocity change signal to the motor during the estimated time.

5 Claims, 4 Drawing Sheets

CONSTANT LINEAR VELOCITY OPTICAL DISK APPARATUS HAVING IMPROVED CIRCUITRY FOR SPEED DATA ACCESS

BACKGROUND OF THE INVENTION

1Field of the Invention

The present invention generally relates to an optical disk apparatus, and more particularly to an optical disk apparatus in which a rotation of a disk motor is controlled to keep a linear velocity of an optical disk constant.

2Description of the Prior Art

There are two types of disk rotation control methods for controlling a rotation of a disk motor on an optical disk device to keep a rotating velocity of an optical disk constant: one is a Constant Angular Velocity (CAV) method and the other is a Constant Linear Velocity (CLV) method. Many compact disk devices in these years use the CLV method to control the rotation of the disk motor.

In a conventional optical disk apparatus which uses the CLV method, the rotation of the disk motor is controlled to always set the linear velocity of the disk at a fixed constant value even though the pickup lies at any position of the disk. As the linear velocity of the disk is kept constant, a rotating speed of the disk motor when the pickup is located at an inner position of the disk and a rotating speed of the disk motor when the pickup is located at an outer position of the disk have to differ from each other. If the pickup is moved towards the center of the disk the magnitude of the rotating speed of the disk motor must increase, and, on the other hand, if the pickup is moved towards the periphery of the disk the magnitude of the rotating speed of the disk motor must decrease.

Figure 3:
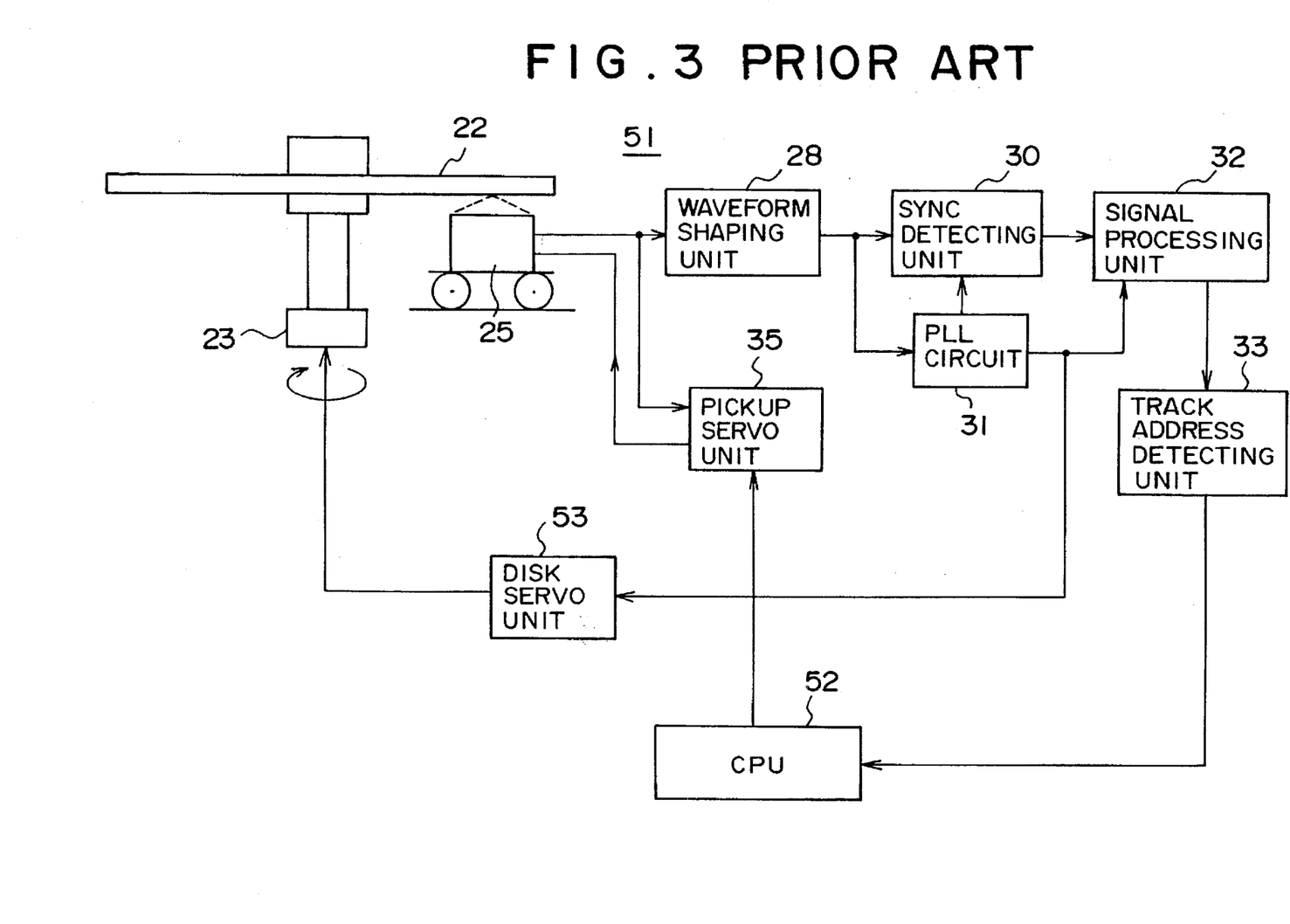
FIG. 3 is a block diagram showing a conventional optical disk apparatus.

FIG. 3 shows a conventional optical disk apparatus 51. In this optical disk apparatus, after a seek is performed by a pickup to jump from the present track of a disk to a destination track thereof, a CLV servo control procedure based on a data signal read from the destination track of the disk is carried out.

In the optical disk apparatus 51 in FIG. 3, a disk 22 is irradiated with a laser beam from a pickup 25 so that a data signal is read from the disk 22. The data signal indicates data read from the disk 22. The pickup 25 supplies the data signal to a sync detecting unit 30 and a phase-locked loop (PLL) circuit 31 through a waveform shaping unit 28.

At the PLL circuit 31, a phase of the data signal from the waveform shaping unit 28 is locked to a phase of a reference signal supplied from an oscillator (not shown in FIG. 3) to generate a clock signal used to carry out demodulation. This clock signal from the PLL circuit 31 is supplied to the sync detecting unit 30, a signal processing unit 32, and a disk servo unit 53 at the same time.

The sync detecting unit 30 supplies the data signal, output from the waveform shaping unit 28, to the signal processing unit 32 in synchronism with the clock signal from the PLL circuit 31.

At the signal processing unit 32, error correction and analog-to-digital conversion processes are carried out for the data signal supplied from the sync detecting unit 30. After those processes are carried out, the signal processing unit 32 supplies a processed signal to a track address detecting unit 33. This processed signal may be supplied also to another unit (not shown in FIG. 3) of the optical disk apparatus 51. However, for the sake of convenience, a description thereof will be omitted.

The track address detecting unit 33 detects a track address based on the processed signal supplied from the signal processing unit 32, and outputs a signal indicating the track address information to a central processing unit (CPU) 52.

The CPU 52 generates a control signal based on the track address information from the track address detecting unit 33, and supplies the control signal to the pickup servo unit 35 to control focusing, tracking and 10 feeding operations of the pickup 25 through the pickup servo unit 35.

The pickup servo unit 35 generates a focusing signal, a tracking signal or a feeding signal based on the data signal from the pickup 25 under the control of the CPU 52, and supplies one of these signals to the pickup 25 to control the focusing operation, tracking operation or feeding operation of the pickup 25.

The disk servo unit 53 is connected to a disk motor 23 which rotates the disk 22, and controls the rotation of the motor 23 in synchronism with the clock signal from the PLL circuit 31 to keep the linear velocity of the disk 22 constant.

When a seek is performed by the pickup 25 to jump from the present track of the disk 22 to a destination track thereof, the CPU 52 controls the pickup servo unit 35 so that the pickup 25 can reach the destination track of the disk 22. In the case of the conventional apparatus 51, after the pickup 25 reaches the destination track, the CLV servo control procedure is started to control the rotation of the disk motor 23 through the disk servo unit 53 in response to the data signal read from the destination track of the disk 22.

To control the track jump of the pickup 25 to the destination track, the disk 22 is always irradiated with the laser beam from the pickup 25, and the pickup 25 is moved in accordance with track address information output from the track address detecting unit 33 during the track jump of the pickup 25.

Alternatively, a distance between the present track and the destination track is calculated based on a difference between the present track address and the destination track address, and the track jump of the pickup 25 is controlled in accordance with the calculated distance.

Figure 4:
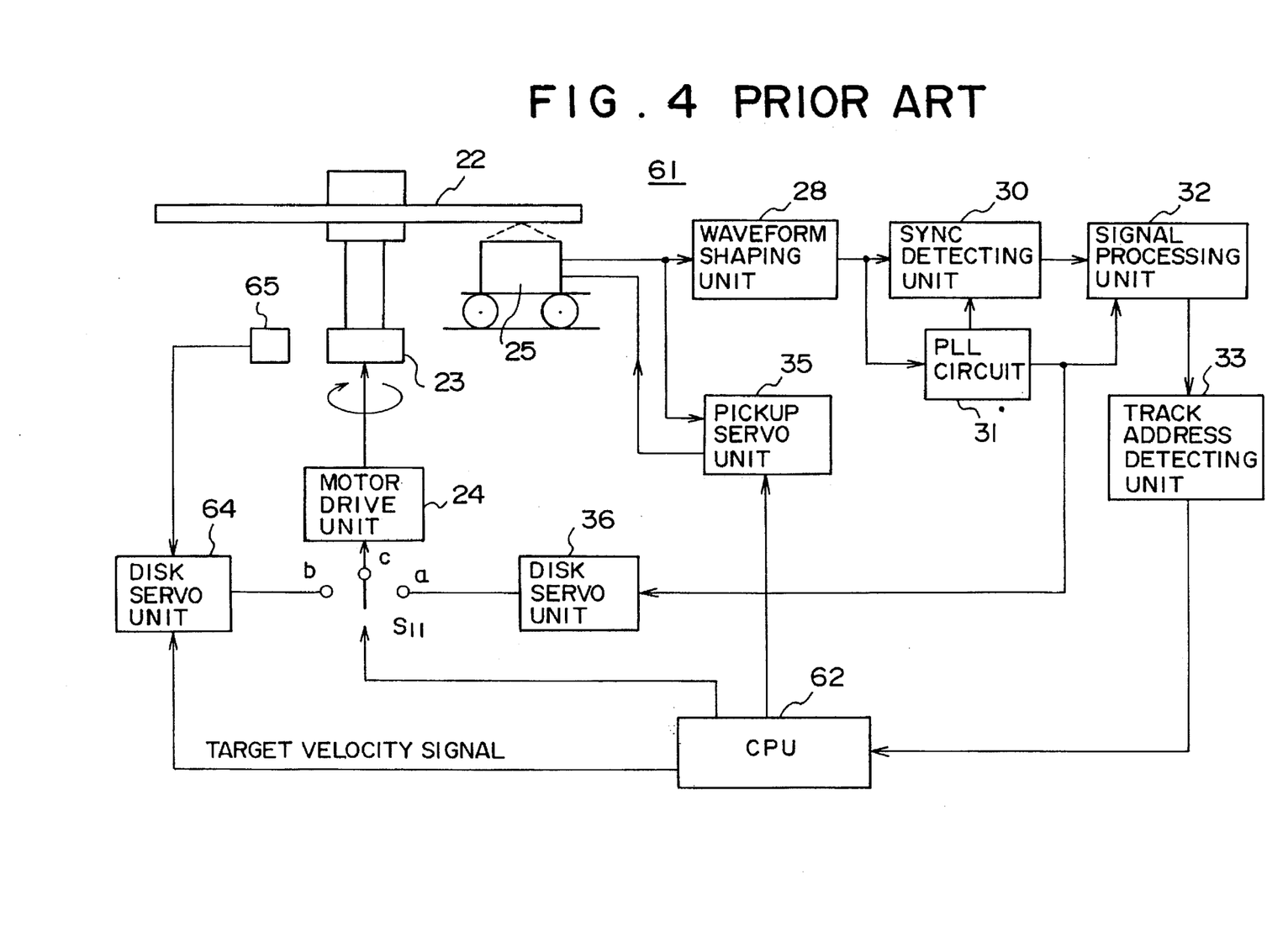
FIG. 4 is a block diagram showing another conventional optical disk apparatus.

FIG. 4 shows another conventional optical disk apparatus 61. In FIG. 4, parts of the optical disk apparatus 61 which are the same as corresponding parts of the optical disk apparatus 51 in FIG. 3 are designated by the same reference numerals, and a description thereof will be omitted.

The conventional optical disk apparatus 61, as shown in FIG. 4, includes a disk servo unit 64 and a motor speed sensor 65 in addition to the elements of the optical disk apparatus 51 shown in FIG. 3. The disk servo unit 64 is provided separately from the disk servo unit 36 which performs the above CLV servo control procedure. In this optical disk apparatus 61, the motor speed sensor 65 supplies a signal indicating a rotating speed of the disk motor 23 to the disk servo unit 64. The disk servo unit 64 controls the rotating speed of the disk motor 23 in accordance with the signal from the motor speed sensor 65 through the motor drive unit 24 to a predetermined rotating speed. The predetermined rotating speed is defined by a target velocity signal supplied from a CPU 62 as an angular velocity at a destination track of the rotating disk 22. This is performed by the disk servo unit 64 independently of the CLV servo control procedure performed by the disk servo unit 36.

When a seek is performed by the pickup 25 to jump from the present track of the disk 22 to the destination track thereof, the CPU 62 controls the rotation of the disk motor 23 through the disk servo unit 64, so that the rotating speed of the disk motor 23 is changed from an angular velocity at the present track of the disk 22 to an angular velocity at the destination track of the disk 22.

The conventional optical disk apparatus 61 includes a switch S11 with a set of terminals "A", "B" and "c". An input of the motor drive unit 24 is connected to the terminal "c" of the switch S11. An output of the disk servo unit 36 is connected to the terminal "a" of the switch S11. An output of the disk servo unit 64 is connected to the terminal "b" of the switch S11.

The disk servo unit 36 supplies a servo signal to the terminal "a" of the switch S11 in synchronism with the clock signal from the PLL circuit 31. The motor drive unit 24 amplifies a servo signal from the terminal "c" of the switch S11, and supplies the servo signal to the disk motor 23 to control the rotation of the disk motor 23. The servo signal is sent from one of the input terminals "a" and "b" of the switch S11 to the motor drive unit 24 depending on which the output terminal "c" of the switch S11 is connected to either the input terminal "a" or the input terminal "b".

The disk servo unit 64 generates a servo signal by using the speed signal from the motor speed sensor 65, and supplies the servo signal to the terminal "b" of the switch S11. When this servo signal is supplied to the disk motor 23 through the motor drive unit 24, the rotation of the disk motor 23 is controlled so that the rotating speed of the disk motor 23 accords with the predetermined rotating speed defined by the target velocity signal from the CPU 62.

When data is read from or written onto the disk 22 by using the pickup 25, the terminal "c" of the switch S11 is connected to the terminal "a" thereof in accordance with a switch signal supplied from the CPU 62. Thus, the servo signal from the disk servo unit 36 is supplied to the disk motor 23 through the motor drive unit 24, so that the CLV servo control procedure is carried out.

When a seek is performed by the pickup 25 to jump from the present track of the disk 22 to the destination track thereof, the terminal "c" of the switch S11 is connected to the terminal "b" thereof in accordance with a switch signal supplied from the CPU 62. The CPU 62 supplies, at the same time, a seek start signal to the pickup servo unit 35 to start a seek operation of the pickup 25. At this Lime, the servo signal from the disk servo unit 64 is supplied to the disk motor 23 through the motor drive unit 24. Therefore, even when the seek is performed by the pickup 25, the rotating speed of the disk motor 23 can be controlled to reach the angular velocity at the destination track of the disk 22, at the same time as the pickup 25 reaches the destination track of the disk 22.

After the pickup 25 reaches the destination track of the disk 22 and the rotating speed of the disk motor 23 reaches the angular velocity at the destination track, the terminal "c" of the switch S11 is connected to the terminal "a" thereof in accordance with the switch signal supplied from the CPU 62. Thus, the data recording or data reproduction of the disk 22 is carried out by using the pickup 25 while the CLV servo control procedure is performed.

In the conventional apparatus 51 in FIG. 3, after the pickup 25 reaches the destination track, the CLV servo control procedure is started to control the rotation of the disk motor 23 in response to the data signal read from the destination track of the disk 22. However, while a seek is performed by the pickup 25, the CLV servo control procedure is not started. The time needed for performing the seek and the time needed for completing the CLV servo control procedure are necessary to complete the data recording or data reproduction. Therefore, it is difficult for the optical disk apparatus 51 to realize a high-speed data access to the disk 22.

In the conventional apparatus 61 in FIG. 4, it is necessary to additionally provide the disk servo unit 64 and the motor speed sensor 65, in order to start the CLV servo control procedure while the seek is performed. Even if the speed of the data access to the optical disk is increased, the cost of manufacture of the optical disk apparatus is considerably raised.

SUMMARY OF THE INVENTION

Accordingly, it is a general object of the present invention to provide an improved optical disk apparatus in which the above-described problem is eliminated.

Another object of the present invention is to provide an optical disk apparatus which realizes a high-speed data access with a low cost of manufacture.

The above-mentioned object of the present invention is achieved by an optical disk apparatus which includes a disk servo unit which generates a servo signal based on a data signal read from an optical disk, the servo signal being supplied to a disk motor to control a rotation of the motor so that a linear velocity of the disk is kept constant when data is read from or written onto the disk; a switching unit for enabling a connection of the disk servo unit and the motor when the data is read from or written onto the disk, so that the servo signal from the disk servo unit is supplied to the motor, and for disconnecting the disk servo unit from the motor when a pickup jumps from a present track of the disk to a destination track thereof so that the supply of the servo signal to the motor is inhibited; a signal generating unit for generating a velocity change signal which enables the motor to increase or decrease a rotating speed of the motor depending on which one of inward and outward directions of the track jump is specified by a direction signal; a time estimating unit for generating a time signal defining an estimated time of the track jump required to change an angular velocity at the present track to an angular velocity at the destination track; and a signal supplying unit for supplying the velocity change signal, output from the signal generating unit, to the motor during the estimated time defined by the time signal from the time estimating unit.

According to the present invention, the rotating speed of the disk motor is controlled to the angular velocity at the destination track of the optical disk while the pickup is moving to the destination track thereof, and the time needed to control the rotation of the disk motor can be reduced. Thus, it is possible for the optical disk apparatus of the present invention to remarkably increase the speed of the data access to the optical disk. There is no need for additionally providing a motor speed sensor and a secondary disk servo unit in the optical disk apparatus of the present invention.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of an optical disk apparatus in one embodiment of the present invention, with reference to FIGS. 1 and 2.

Figure 1:
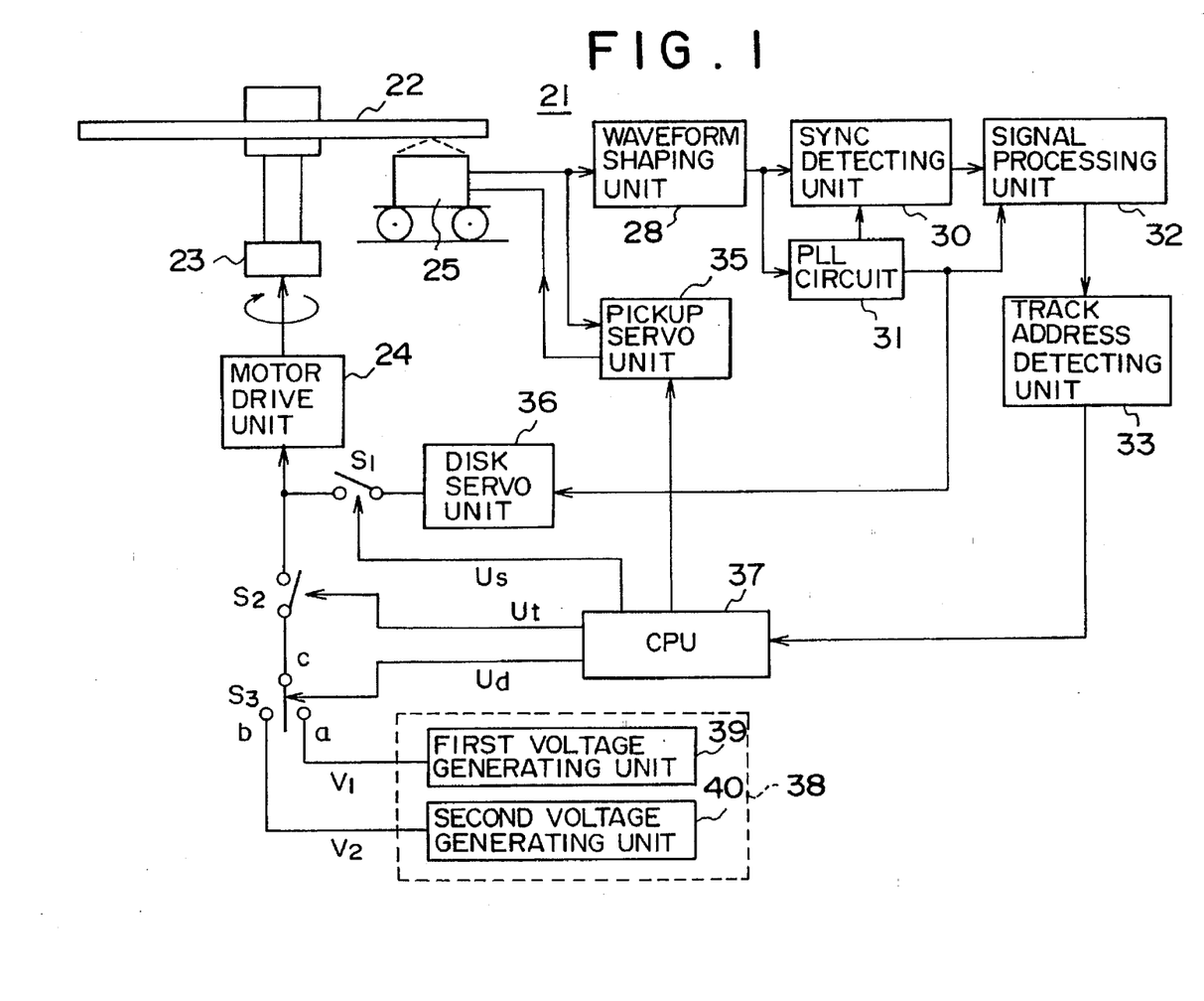
FIG. 1 is a block diagram showing an optical disk apparatus in one embodiment of the present invention.

FIG. 1 shows an optical disk apparatus 21 to which the embodiment of the present invention is applied. In FIG. 1, parts of the optical disk apparatus 21 which are the same as corresponding parts of the apparatus 51 in FIG. 3 are designated by the same reference numerals, and a description thereof will be omitted.

In the optical disk apparatus 21, the disk 22 is irradiated with a laser beam from the pickup 25 so that a data signal is read from the disk 22. The pickup 25 supplies the data signal to the sync detecting unit 30 and to the PLL 31 through the waveform shaping unit 28.

A clock signal from the PLL circuit 31 is supplied to the sync detecting unit 30, the signal processing unit 32, and a disk servo unit 36 at the same time.

The sync detecting unit 30 supplies the data signal, output from the waveform shaping unit 28, to the signal processing unit 32 in synchronism with the clock signal from the PLL circuit 31 for each bit of the data signal.

At the signal processing unit 32, error correction and analog-to-digital conversion processes for the data signal from the sync detecting unit 30 are performed. After these processes are performed, the signal processing unit 32 supplies the processed signal to the track address detecting unit 33. This processed signal may be supplied to another unit (not shown) of the optical disk apparatus 21.

The track address detecting unit 33 detects a track address from the processed signal from the signal processing unit 32, and outputs a signal indicating the track address information, to a CPU 37.

The CPU 37 generates a control signal based on the track address information from the track address detecting unit 33, and supplies the control signal to the pickup servo unit 35 to carry out focusing, tracking and feeding operations of the pickup 25 with relation to the disk 22 through the pickup servo unit 35.

The pickup servo unit 35 generates a focusing signal, a tracking signal or a feeding signal based on the data signal from the pickup 25, under the control of the CPU 37, and supplies each signal to the pickup 25 to carry out the focusing, tracking and feeding operations of the pickup 25 with relation to the disk 22.

An output of the disk servo unit 36 is connected to an input of the disk motor 23 via the motor drive unit 24, and supplies a linear velocity signal to the disk motor 23 in synchronism with the clock signal output from the PLL circuit 31, so that the rotation of the disk motor 23 is controlled in accordance with the linear velocity signal to keep the linear velocity of the disk 22 constant.

The optical disk apparatus 21 includes a switch S1 between an input of the motor drive unit 24 and the output of the disk servo unit 35. The linear velocity signal from the disk servo unit 36 is supplied to one terminal of the switch S1. The other terminal of the switch S1 is connected to the input of the motor drive unit 24. This switch S1 is opened or closed in accordance with a mode switch signal Us supplied from the CPU 37.

The optical disk apparatus 21 includes a switch S2, a switch S3, and a velocity change signal generating unit 38. The velocity change signal generating unit 38 includes a first voltage generating unit 39 and a second voltage generating unit 40.

The first voltage generating unit 39 generates a voltage increase signal V1. If the motor drive unit 24 receives this voltage increase signal V1, a drive voltage applied to the disk motor 23 is raised to increase the rotating speed of the disk motor 23. In this embodiment, the voltage increase signal V1 from the first voltage generating unit 39 is supplied to one terminal of the switch 3, indicated by "a" in FIG. 1.

The second voltage generating unit 40 generates a voltage decrease signal V2. If the motor drive unit 24 receives this voltage decrease signal V2, the drive voltage applied to the disk motor 23 is lowered to decrease the rotating speed of the disk motor 23. In this embodiment, the voltage decrease signal V2 from the second voltage generating unit 40 is supplied to another terminal of the switch S3, indicated by "b" in FIG. 1.

The CPU 37 supplies a direction signal Ud to another terminal of the switch S3, indicated by "c" in FIG. 1. The terminal "c" of the switch 3 is selectively connected to either the terminal "a" or the terminal "b" in accordance with the direction signal Ud supplied from the CPU 37. The direction signal Ud indicates which one of inward and outward directions of the track jump of the pickup 25 is specified. The CPU 37 detects whether the pickup 25 should jump in the inward direction (toward the center of the disk) or in the outward direction (toward the periphery of the disk), based on the track addresses read from the present and destination tracks of the disk 22. Accordingly, supplying the voltage increase signal V or the voltage decrease signal V2 to the motor drive unit 24 via the switch "3"depends on which one of the two directions of the track jump of the pickup 25 is specified by the direction signal Ud from the CPU 37.

One terminal of the switch S2 is connected to the terminal "c" of the switch S3, and the other terminal of the switch S2 is connected to the input of the motor drive unit 24. The switch S2 is opened or closed in accordance with a time signal Ut supplied from the CPU 37.

Transistors, MOS-FETs (metallic oxide semiconductor-field effect transistors) or other devices may be used to produce the switches S1, S2 and S3.

A signal generating unit of the optical disk apparatus according to the present invention is constituted by the velocity change signal generating unit 38 described above. In the embodiment shown in FIG. 1, the velocity change signal generating unit 38 is comprised of the first voltage generating unit 39 and the second voltage generating unit 40.

A switching unit of the optical disk apparatus according to the present invention is constituted by the switch S1 and the CPU 37 supplying the mode switch signal Us to the switch S1, A signal supplying unit of the optical disk apparatus according to the present invention is constituted by the switches S2 and S3 and the CPU 37 supplying the time signal Ut and the direction signal Ud to these switches S2 and S3.

Next, a description will be given of a method of generating a time signal Ut defining an estimated time required to change the angular velocity at the present track of the disk to the angular velocity at the destination track thereof.

Figure 2:
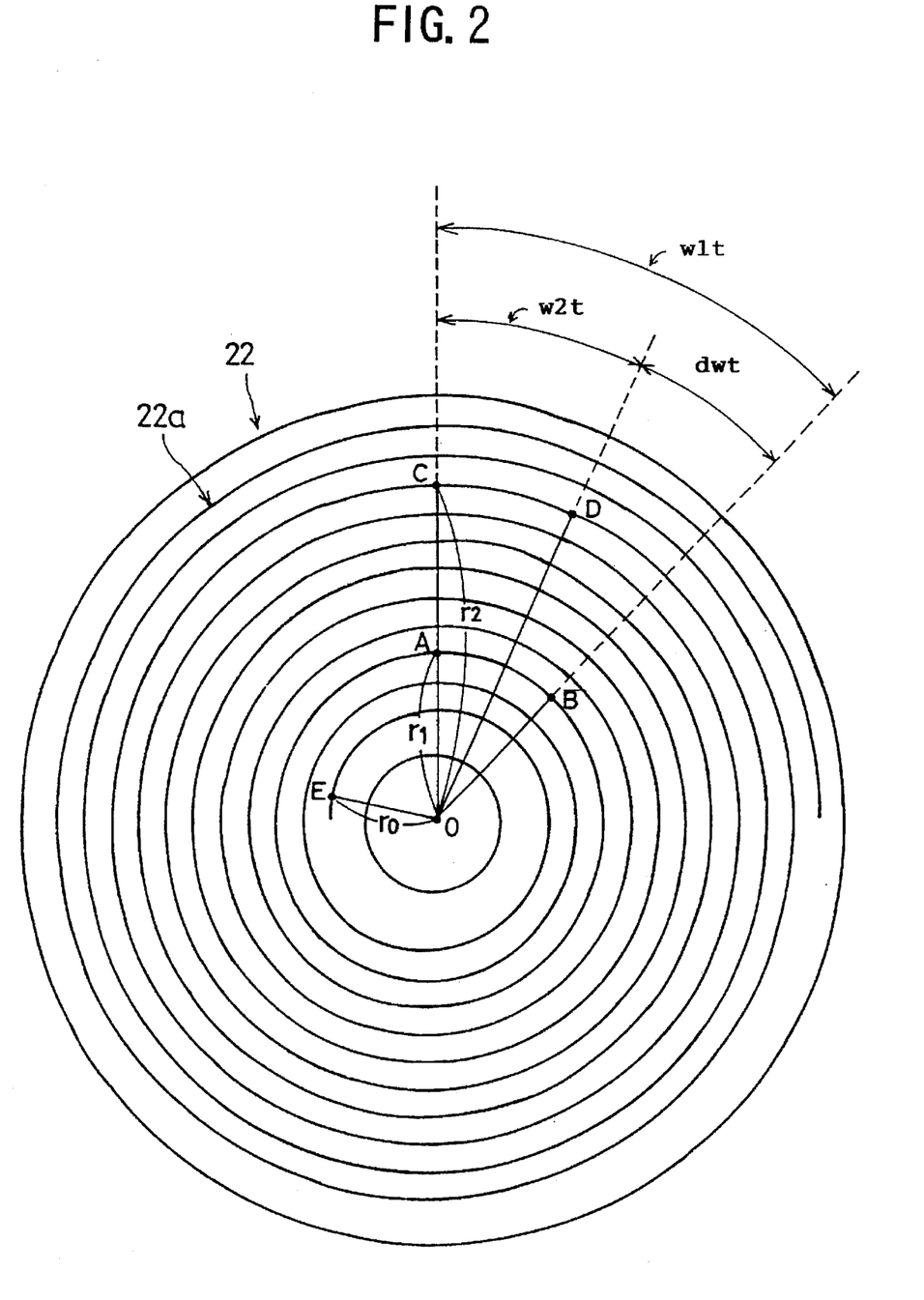
FIG. 2 is a diagram for explaining a relationship of the angular velocity versus the disk track.

FIG. 2 shows a relationship of the angular velocity versus the disk track As shown in FIG. 2, the optical disk 22 is formatted so that a spiral circle 22a is formed on it, and a plurality of tracks with different radiuses are arranged thereon. An angular velocity "w" at a track of the disk 22 which is rotated around the center thereof is in inverse proportion to a radius "r" at which the track lies on the disk 22. The radius r is the distance between the track and the center 0 of the disk.

In FIG. 2, the location of the present track on the disk 22 is indicated by a point A and a radius of the present track is indicated by $r_1$, and the location of the destination track on the disk 22 is indicated by a point C and a radius of the destination track is indicated by $r_2$. Also, the location of the innermost track on the disk 22 is indicated by a point E in FIG. 2 and a predetermined radius of the innermost track is indicated by $r_o$.

A first angular velocity $w_1$ at the present track of the disk 22 and a second angular velocity $w_2$ at the destination track thereof when the linear velocity of the disk is kept constant will be taken into account. Suppose that, within a time t a laser beam from the pickup 25 moves at the first angular velocity $w_1$ from the point A to a point B on the present track, the laser beam from the pickup 25 moves at the second angular velocity $w_2$ from the point C to a point D on the destination track. At this time, the length of the arc AB is equal to the length of the arc CD. As the radius $r_1$ of the present track is smaller than the radius $r_2$ of the destination track in the case of FIG. 2, the first angular velocity $w_1$ is greater than the second angular velocity $w_2$.

When a seek is performed by the pickup 25 to jump from the present track (the radius $r_1$) to the destination track (the radius $r_2$), a difference dw between the first angular velocity $w_1$ and the second angular velocity $w_2$ is represented by $$dw = |w_1 - w_2| = |(r_o/r_1) \cdot w_o - (r_o/r_2) \cdot w_o| \quad (1)$$

where $w_o$ is an angular velocity at the innermost track of the disk 22, and $r_o$ is a predetermined radius of the innermost track of the disk 22.

The angular velocity $w_o$ at the innermost track of the disk 22 is defined as follows.

$$w_o = Vc/r_o \quad (2)$$

where Vc is a predetermined linear velocity of the disk 22.

Accordingly, the difference dw in the angular velocity when the seek is performed by the pickup 25 to jump from the present track of the disk to the destination track thereof can be calculated in accordance with the above Equations (1) and (2). To calculate the difference dw in the angular velocity in accordance with the above Equations (1) and (2), it is necessary to obtain the radius $r_1$ of the present track and the radius $r_2$ of the destination track. The radius $r_1$ can be obtained from a track address read from the present track of the disk 22, and the radius $r_2$ can be obtained from a track address read from the destination track of the disk 22.

A motor acceleration coefficient $K\alpha$ [rad/s$^2$/V] is predetermined according to a specification of the disk motor 23. In accordance with the predetermined motor acceleration coefficient $K\alpha$, the magnitude of the voltage increase signal V1 from the first voltage generating unit 39 is set to an appropriate value, and the magnitude of the voltage decrease signal V2 from the second voltage generating unit 40 is set to another appropriate value. A motor acceleration coefficient $K\alpha$ related to the voltage increase signal V1 and a motor acceleration coefficient $K\alpha$ related to the voltage decrease signal V2 are different from each other.

An estimated time "Te" required to change the angular velocity $w_1$ at the present track of the disk 22 by the angular velocity difference dw defined by the above Equation (1), when the velocity change signal (V1 or V2) from the velocity change signal generating unit 38 is supplied to the disk motor 23 via the motor drive unit 24, is defined as follows.

$$Te = dw/K\alpha \quad (3)$$

where $K\alpha$ is the motor acceleration coefficient which is predetermined according to the specification of the disk motor 23.

The estimated time Te defined by the above Equation (3) indicates an optimum acceleration time or an optimum deceleration time for controlling the rotating speed of the disk motor 23 in the above embodiment.

In the embodiment shown in FIG. 1, the CPU 37 generates the time signal Ut which defines the estimated time Te according to the above Equation (3). Supplying the velocity change signal, output from the velocity change signal generating unit 38, to the disk motor 23 during the estimated time Te defined by the time signal Ut from the CPU 37 makes it possible to change the angular velocity at the present track to the angular velocity at the destination track when the seek is performed by the pickup 25. The disk servo unit 36 at this time is disconnected from the motor drive unit 24 by the switch S1 which is opened.

The drive voltage applied to the disk motor 23 when the rotating speed of the disk motor 23 is controlled is set to a maximum drive voltage value at which the disk motor 23 generates a maximum torque.

When a seek time Ts needed for the pickup 25 to perform the seek is longer than the estimated time Te, both the switches S1 and. S2 are opened (OFF) when the estimated time Te has elapsed. The disk motor 23 continues to be rotated to keep the angular velocity at the destination track until the seek is completed. After the seek is completed, the CLV servo control procedure is started.

When the seek time Ts is shorter than the estimated time Te, the switch S1 is closed (ON) and the switch S2 is opened (OFF) when the seek is completed, and the CLV servo control procedure is started thereafter.

Next, a description will be given of the operation of the optical disk apparatus 21 in one embodiment of the present invention.

When data is read from or written onto the disk 22, the switch S1 is closed in accordance with the mode switch signal Us supplied from the CPU 37. As the time signal Ut from the CPU 37 is not supplied to the switch S2 at this time, the switch S2 is in its open condition. Thus, the disk servo unit 36 is connected to the motor drive unit 24 via the switch S1, and the CLV servo control procedure to keep the linear velocity of the disk 22 constant is carried out in synchronism with the clock signal supplied from the PLL circuit 31.

If a seek command from an external unit is supplied to the CPU 37, the seek operation of the pickup 25 is started. A feeding signal from the CPU 37 is supplied to the pickup servo unit 35 so that the seek is carried out by the pickup 25. The switch S1 is opened in accordance with the mode switch signal supplied from the CPU 37, and the disk servo unit 36 is disconnected from the motor drive unit 24. The switch S2 is in its closed condition during the estimated time Te defined by the time signal Ut supplied from the CPU 37.

In addition, when the seek is performed by the pickup 25, the CPU 37 supplies the direction signal Ud to the switch S3. The CPU detects whether the pickup 25 should jump in the inward direction or in the outward direction, based on the track addresses read from the present and destination tracks of the disk 22. The direction signal Ud supplied from the CPU 37 indicates which one of the two directions of the track jump of the pickup 25 is specified. Connecting the terminal "c" of the switch S3 to the terminal "a" thereof, leading to the output of the first voltage generating unit 39, or the terminal "b", leading to the output of the second voltage generating unit 40 depends on whether the direction signal Ud indicates the inward direction or the outward direction of the track jump of the pickup.

More specifically, when the seek is performed by the pickup 25 to jump in the outward direction, a feeding operation of the pickup 25 is started, and the CPU 37 generates the estimated time Te in accordance with the Equations (1) through (3). The switch S1 is opened, and the switch S3 is switched to enable the second voltage generating unit 40 to be connected to the terminal "c" of the switch S3 leading to the motor drive unit 24. The switch S2 continues to be in the closed condition during the estimated time Te defined by the time signal Ut supplied from the CPU 37. Thus, the voltage decrease signal V2 from the second voltage generating unit 40 is supplied to the motor drive unit 24 during the estimated time Te so that the rotating speed of the disk motor 23 is controlled to the angular velocity at the destination track of the disk 22.

After the pickup 25 reaches the destination track of the disk 22, a tracking-ON signal is sent to the CPU 37. The switch S1 is closed by the mode switch signal from the CPU 37. As the disk servo unit 36 is connected to the motor drive unit 24, the CLV servo control procedure is carried out.

On the other hand, when the seek is performed by the pickup 25 to jump in the inward direction, the switch S3 is switched to enable the first voltage generating unit 39 to be connected to the terminal "c" of the switch S3 leading to the motor drive unit 24. The other operations are the same as those when the pickup 25 jumps in the inward direction.

In the above-described embodiment, when a seek is performed by the pickup to jump to a destination track of the disk, supplying the servo signal, output from the disk servo unit, to the disk motor is inhibited, and the velocity change signal, output from the velocity change signal generating unit, is supplied to the disk motor during the estimated time only. A time signal defining the estimated time required to change the angular velocity at the present track to the angular velocity at the destination track is generated by the CPU.

In the above-described embodiment, the rotating speed of the disk motor is controlled to the angular velocity at the destination track of the optical disk while the pickup is moving to the destination track thereof, and the time needed to control the rotation of the disk motor can be reduced. Thus, it is possible for the optical disk apparatus of the present invention to remarkably increase the speed of the data access to the optical disk. Also, it is not necessary to additionally provide a motor speed sensor and a secondary disk servo unit.

In the above-described embodiment, the estimated time required to change the angular velocity at the present track of the disk to the angular velocity at the destination track thereof is determined based on the track addresses read from the present and destination tracks of the disk. The angular velocity at the destination track of the disk as the result of the controlling of the disk motor rotation can be accurate. Thus, the speed of the data access can remarkably be increased.

In an optical disk apparatus in another embodiment of the present invention, a map which defines a relationship of the track address difference versus the estimated time of the required velocity change is stored in a memory. In this optical disk apparatus, the estimated time can be read out from the map based on the track addresses read from the present and destination tracks of the disk.

In an optical disk apparatus in another embodiment of the present invention, a gate circuit may be used instead of the switches S2 and S3. This gate circuit is used to selectively supply the voltage increase signal V1 or the voltage decrease signal V2 to the motor drive unit during the estimated time Te defined by the time signal.

Further, the present invention is not limited to the above described embodiments, and variations and modifications may be made without departing from the scope of the present invention.

What is claimed is:

1. An optical disk apparatus including a disk motor and a pickup, wherein the disk motor rotates an optical disk, wherein the pickup moves to a given track of the optical disk by radial movement with respect to the disk, and wherein the disk is irradiated with a laser beam from the pickup to read data from or write data onto the track of the disk, said apparatus comprising:

a disk servo unit generating a servo signal based on a data signal read from the disk, said servo signal controlling the rotation of the motor so that a linear velocity of the disk is kept constant when data is read from or written onto the disk;

switching means for connecting said disk servo unit to the motor when data is read from or written onto the disk, so that the servo signal from the disk servo unit is supplied to the motor, and for disconnecting the disk servo unit from the motor when the pickup jumps from a present track of the disk to a destination track thereof during a seek operation, so that the supplying of the servo signal to the motor is prevented;

signal generating means having a first voltage generating unit and a second voltage generating unit, said first voltage generating unit generating a velocity increase signal for increasing the angular velocity of the motor, and said second voltage generating unit generating a velocity decrease signal for decreasing the angular velocity of the motor, one of said first voltage generating unit and said second voltage generating unit generating, during the seek operation, the respective velocity change signal depending on whether a direction of a track jump of the pickup is radially inward or radially outward on the disk;

time estimating means for generating a time signal defining an estimated time required to change the angular velocity of the disk from that existing when the pickup is at the present track to the angular velocity required at the destination track in order to achieve constant linear velocity of the disk, said estimated time being determined based on the track addresses for the present and destination tracks of the disk and based on a motor acceleration coefficient of the motor; and signal supplying means for supplying the respective velocity change signal, generated by said signal generating means, to the motor during the estimated time defined by the time signal generated by said time estimating means.

2. The optical disk apparatus according to claim 1, wherein said time estimating means determines said time signal by determining an angular velocity difference dw between an angular velocity $w_1$ at the present track with a radius $r_1$ and an angular velocity $w_2$ at the destination track with a radius $r_2$ necessary to achieve constant linear velocity in accordance with the equation.

$$dw=|w_1-w_2|=|(r_o/r_1) \cdot w_o-(r_o/r_2) \cdot w_o|$$

where $w_o$ is an angular velocity t an innermost track of the disk, and $r_o$ is a predetermined radius of the innermost track of the disk, and by dividing the difference dw so determined by a predetermined motor acceleration coefficient $K\alpha$ of the disk motor.

3. The optical disk apparatus according to claim 1, wherein said switching means comprises a switch provided between the motor and the disk servo unit, said switch being opened or closed in accordance with a switch signal.

4. The optical disk apparatus according to claim 1, wherein said signal supplying means comprises a switch provided between the motor and the signal generating means, said switch being continuously set in a closed condition during the estimated time defined by the time signal.

5. The optical disk apparatus according to claim 1, wherein said signal supplying means comprises a switch which includes an output terminal connected to the motor, an input terminal connected to said first voltage generating unit, and an input terminal connected to said second voltage generating unit.

* * * * *